(12) United States Patent
Weisz

(10) Patent No.: US 6,726,588 B2
(45) Date of Patent: Apr. 27, 2004

(54) DIFFERENTIAL ELECTRIC ENGINE WITH VARIABLE TORQUE CONVERSION

(75) Inventor: Ervin Weisz, Willowdale (CA)

(73) Assignee: CVET Patent Technologies, Inc., Toronto (CA)

( * ) Notice: Subject to any disclaimer, the term of this patent is extended or adjusted under 35 U.S.C. 154(b) by 73 days.

(21) Appl. No.: 10/222,881

(22) Filed: Aug. 19, 2002

(65) Prior Publication Data

US 2002/0193197 A1 Dec. 19, 2002

Related U.S. Application Data

(63) Continuation of application No. 09/842,032, filed on Apr. 26, 2001, now Pat. No. 6,461,266.

(51) Int. Cl.$^7$ ............................. F16H 3/72; F16H 37/10
(52) U.S. Cl. ............................. 475/5; 475/6; 475/150; 475/221; 477/20
(58) Field of Search ............................. 475/5, 6, 150, 475/151, 184, 153, 221, 329, 332; 477/20, 15

(56) References Cited

U.S. PATENT DOCUMENTS

| | | | |
|---|---|---|---|
| 1,130,053 A | 3/1915 | Barnum | |
| 1,423,090 A | 7/1922 | Delano | |
| 1,667,718 A | 5/1928 | Connell | |
| 1,853,058 A | 4/1932 | Johnson | |
| 3,260,133 A | 7/1966 | Mattsoh | |
| 3,861,484 A | 1/1975 | Joslin | |
| 3,888,326 A | 6/1975 | Osborne | |
| 4,392,393 A | * 7/1983 | Montgomery | 475/6 |
| 4,464,973 A | 8/1984 | Rodler, Jr. | 89/40 |
| 4,579,019 A | 4/1986 | Gabriele | |
| 4,663,937 A | 5/1987 | Cullin | |
| 4,685,354 A | 8/1987 | McCabria | |
| 4,834,319 A | 5/1989 | Ewy et al. | |
| RE33,278 E | * 7/1990 | Johnshoy | 475/6 |
| 4,976,669 A | * 12/1990 | Jones | 475/332 |
| 5,033,996 A | * 7/1991 | Frey | 475/6 |
| 5,120,282 A | 6/1992 | Fjallstrom | |
| 5,310,387 A | 5/1994 | Savagian | |
| 5,318,142 A | 6/1994 | Bates et al. | |
| 5,343,970 A | 9/1994 | Severinsky | |
| 5,487,438 A | 1/1996 | Kinoshita | |
| 5,558,589 A | 9/1996 | Schmidt | 475/5 |
| 5,558,595 A | 9/1996 | Schmidt et al. | |
| 5,562,566 A | 10/1996 | Schmidt | |
| 5,571,058 A | 11/1996 | Schmidt | |
| 5,577,973 A | 11/1996 | Schmidt | |
| 5,644,200 A | 7/1997 | Yang | |
| 5,662,009 A | * 9/1997 | Palmer | 475/221 |
| 5,680,908 A | 10/1997 | Reed | |

(List continued on next page.)

FOREIGN PATENT DOCUMENTS

| | | | | |
|---|---|---|---|---|
| DE | 1047629 | * | 12/1958 | 475/6 |
| DE | 199 03 936 | | 5/2000 | |
| SU | 744176 | * | 6/1980 | 475/6 |

Primary Examiner—Ha Ho
(74) Attorney, Agent, or Firm—Neil H. Hughes; Ivor M. Hughes; Marcelo K. Sarkis

(57) ABSTRACT

The differential engine comprises a motor, a torque conversion stage, and a loading mechanism. The torque conversion stage includes first and second differential stages which are coupled together with a pair of shafts, with the shafts rotating in opposite directions. The first differential stage comprises an input shaft which is coupled to the output shaft of the motor, and first and second output shafts which are coupled to the respective shafts. The second differential stage comprises an output coupled to the output drive shaft, and first and second input shafts which are coupled to the respective shafts. The second differential stage includes a gear mechanism which applies a rotational torque to the output drive shaft when a difference occurs between the rotational speeds for the shafts. The rotational speeds of the shafts are varied by loading one or both of the shafts.

14 Claims, 7 Drawing Sheets

U.S. PATENT DOCUMENTS

| | | |
|---|---|---|
| 5,730,675 A | 3/1998 | Yamaguchi .................... 475/2 |
| 5,730,676 A | 3/1998 | Schmidt |
| 5,789,823 A | 8/1998 | Sherman |
| 5,811,957 A | 9/1998 | Bose et al. |
| 5,931,757 A | 8/1999 | Schmidt |
| 5,935,035 A | 8/1999 | Schmidt |
| 5,947,855 A | 9/1999 | Weiss |
| 6,022,287 A | 2/2000 | Klemen et al. |
| 6,045,477 A | 4/2000 | Schmidt |
| 6,056,661 A | 5/2000 | Schmidt |
| 6,090,005 A | 7/2000 | Schmidt et al. |
| 6,098,737 A | 8/2000 | Aoki .......................... 180/242 |
| 6,234,930 B1 | 5/2001 | Kaneko et al. |
| 6,461,266 B1 * | 10/2002 | Weisz ............................ 475/6 |

\* cited by examiner

DIFFERENTIAL ELECTRIC ENGINE WITH VARIABLE TORQUE CONVERSION

This application is a continuation of application Ser. No. 09/842,032 filed Apr. 26, 2001 U.S. Pat. No. 6,461,266.

FIELD OF THE INVENTION

The present invention relates to engines, and particularly to a differential engine with variable torque conversion.

BACKGROUND OF THE INVENTION

A major problem with existing electric engines is that the peak efficiency occurs over a relatively narrow range of output speeds, which are not at low or starting speeds. An efficiency-speed curve for a typical engine is shown in FIG. 1 and indicated by reference A. As shown in FIG. 1, the typical electric engine achieves peak efficiency in the range of 80% to something less than 100% and is represented by point B on the efficiency-speed curve A, whereas a low output speeds and startup speeds (indicated by reference C), the efficiency is in the range 20 to 25%.

This problem is compounded by the need for high starting torque if a load, for example, an automobile, has to reach operating speed under acceleration. The starting torque varies directly with acceleration—the higher the acceleration, the higher the required starting torque. As torque is directly proportional to the current in the motor coil, the accelerating torque (e.g. acceleration from a stopped position or deceleration under a controlled reverse motor torque) will demand a significantly higher motor coil current. This means the current required by the motor to produce a given torque at a low speed or from a stop will be much greater than the current that would be needed to produce the same torque at higher speeds because the efficiency of the motor at low speeds is much less than at higher speeds as illustrated by points B and C on the efficiency vs. output-speed in FIG. 1. Furthermore, the energy loss in the motor increases exponentially as this loss is equal to the resistance of the motor winding multiplied by the current raised to the second power.

During stop/start operation of an electric motor powered system, particularly when relatively quick acceleration and deceleration forces are present, the operating efficiency of the electric motor will be well below the peak efficiency point, and is typically in the range of 20% to 25% as indicated by point C in FIG. 1, even lower than this under accelerating/decelerating conditions. As a result, an electric vehicle will travel much farther distances at constant highway driving conditions than within a city.

In view of these and other known deficiencies, there remains a need for an engine which improves on the torque output vs. speed characteristic of known designs and approaches the ideal engine operating characteristic as shown in FIG. 1(b).

BRIEF SUMMARY OF THE INVENTION

The present invention provides a differential engine with variable torque conversion.

In a first aspect, the present invention provides, a differential engine with a variable torque output, the differential engine comprises: (a) a motor for driving an output shaft at a rotational speed and applying an input rotational torque to said output shaft; (b) a torque conversion stage coupled to the motor for converting the input rotational torque into a rotational torque at an output shaft for coupling to a load; (c) the torque conversion stage including a first differential stage, the first differential stage having an input shaft coupled to the output shaft of the motor, and the first differential stage having a gear mechanism for translating the rotational torque from the input shaft to first and second output shafts and the gear mechanism driving each of the output shafts at the same speed and in opposing rotational directions; (d) the torque conversion stage including a second differential stage, the second differential stage having a first input shaft coupled to the first output shaft of the first differential stage, and a second input shaft coupled to the second output shaft of the first differential stage, and including a gear mechanism for applying a rotational torque to the output shaft when a difference occurs between the rotational speeds of the first and second input shafts for the second differential stage; (e) a loading mechanism, the loading mechanism being coupled to one of the input shafts on the second differential, the loading mechanism being responsive to a control input for loading the input shaft to vary the rotational speed of the associated input shaft.

In another aspect, the present invention provides a differential engine with a variable torque output, the differential engine comprises: (a) a motor for driving an output shaft at a constant speed in a predetermined direction; (b) a transmission stage having an input shaft and an output drive shaft for driving a load, the input shaft is coupled to the output shaft of the motor; (c) a regenerative charging stage, the regenerative charging stage has an input for receiving power from the transmission stage and charging an energy storage device; (d) the transmission stage comprises a first differential stage and a second differential stage, the first differential stage has a drive mechanism coupled to the input shaft, and the second differential stage has a drive mechanism coupled to the output drive shaft, and the drive mechanism for the first differential stage is coupled to the drive mechanism for the second differential stage through first and second differential shafts, the differential shafts rotate in opposite directions at the same speed; (e) the transmission stage includes a generator coupled to one of the differential shafts, the generator is responsive to a control input for generating the power output for the regenerative charging stage, and operation of the generator loads the differential shaft and produces a difference in the speed of the differential shafts, and the drive mechanism in the second differential stage translates the difference to the rotational speed of the output drive shaft.

In yet another aspect, the present invention provides a differential engine with a variable torque output, the differential engine comprises, (a) a first motor for driving an output shaft at a rotational speed and applying an input rotational torque to the output shaft; (b) a second motor for driving an output motor shaft at a rotational speed and in a same direction as the output shaft for the first motor; (c) a torque conversion stage coupled to the motor for converting the input rotational torque from the first motor and the second motor into a rotational torque at an output drive shaft for coupling to a load; (d) the torque conversion stage includes a first differential stage, the first differential stage has an input shaft, the first differential stage has a gear mechanism for translating the rotational torque from the input shaft to first and second output shafts and the gear mechanism driving each of the output shafts at the same speed and in opposing rotational directions; (e) the torque conversion stage including a second differential stage, the second differential stage has a first input shaft coupled to the first output shaft of the first differential stage, and a second input shaft coupled to the second output shaft of the first differential stage, and including a gear mechanism for applying a rotational torque to the output drive shaft when a difference occurs between the rotational speeds of the first and second input shafts for the second differential stage; (f) an input stage having a first input shaft coupled to the output shaft of the first motor, and a second input shaft coupled to the output motor shaft of the second motor, and the input stage having an output shaft and the output shaft being coupled to the input shaft of the first differential stage, and the input stage including a gear mechanism for translating the rotational torque from the output motor shaft and the output shaft to the output shaft of the input stage; (g) a loading mechanism, the loading mechanism is coupled to one of the input shafts on the second differential stage, the loading mechanism is responsive to a control input for loading the input shaft to vary the rotational speed of the associated input shaft.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings, which show, by way of example, a preferred embodiment of the present invention, and in which:

FIG. 1(*b*) is a graphical representation of the output efficiency versus speed curve for an ideal motor;

FIG. 3(*b*) is a graphical representation of the output torque versus speed curve for the differential engine according to the present invention;

DETAILED DESCRIPTION OF THE PREFERRED EMBODIMENTS

Figure 1A:
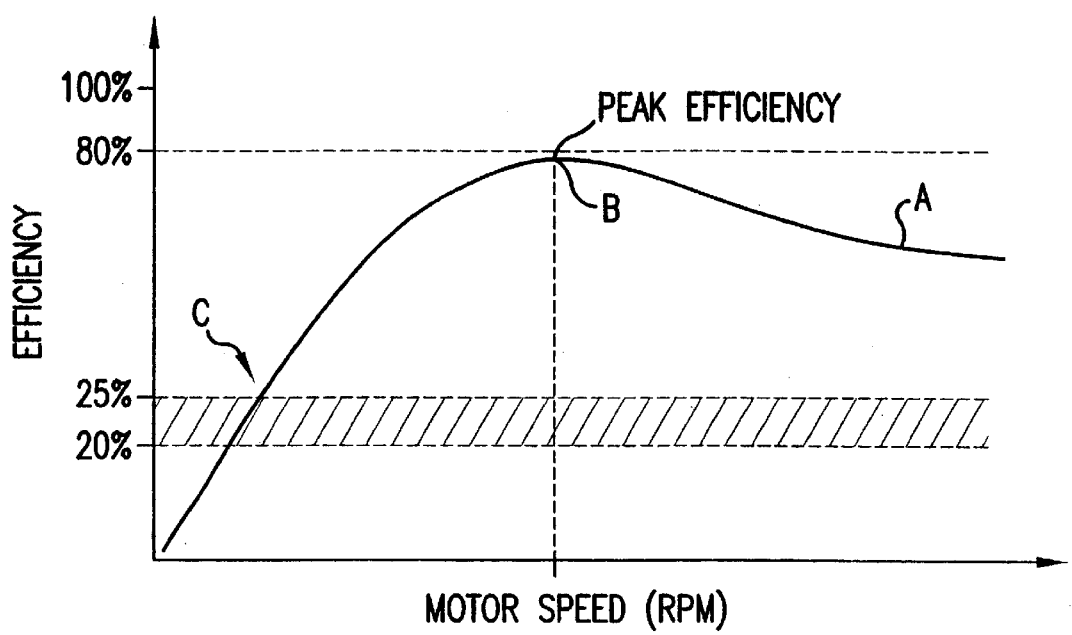
FIG. 1(*a*) is a graphical representation of the output efficiency versus speed curve for a typical electric motor.
Figure 1B:
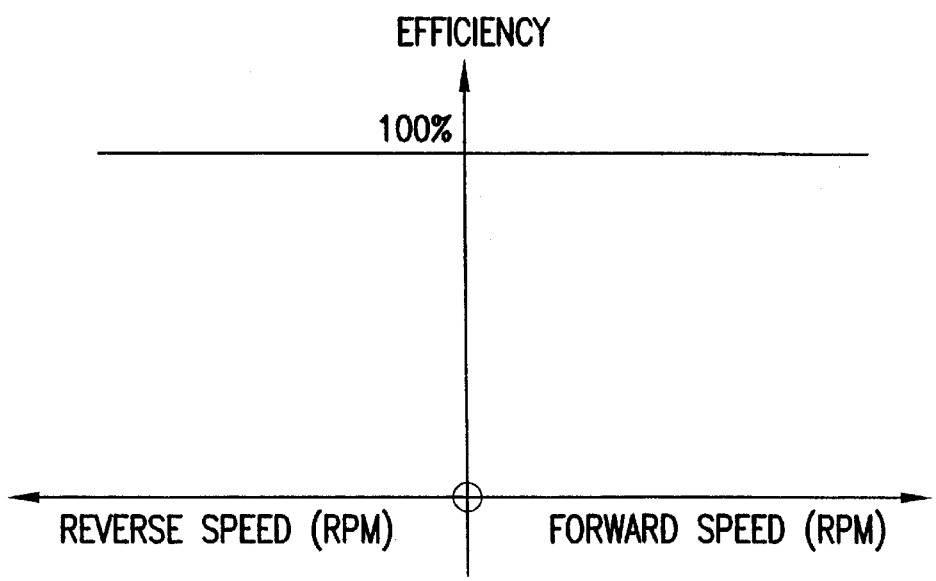
Figure 2:
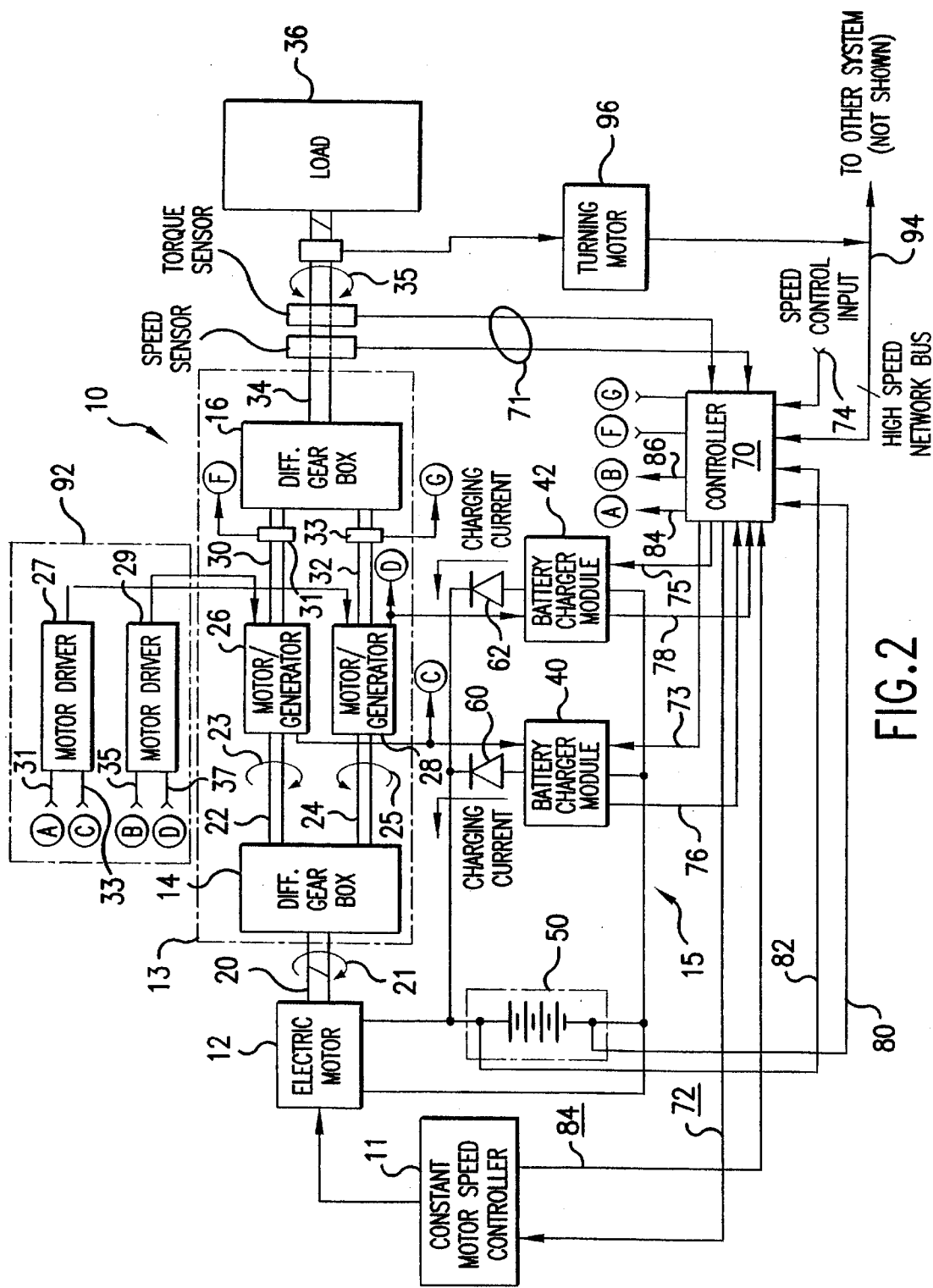
FIG. 2 is a block diagram of a differential engine with variable torque conversion according to the present invention.

Reference is first made to FIG. 2 which shows in block diagram form a differential engine with variable torque conversion according to the present invention and indicated generally by reference 10.

As shown in FIG. 2, the differential engine 10 comprises an electric motor 12, a mechanical epicyclic transmission denoted generally by reference 13, and a constant motor speed controller 11. The epicyclic transmission 13 comprises a first differential gear box 14, and a second differential gear box 16. The first differential gear box 14 has an input shaft 20 which is coupled to the output of the electric motor 12. The differential gear box 14 has first 22 and second 24 output shafts. The first output shaft 22 is coupled to the rotor of a first motor/generator 26 which operates in generator mode as will be described in more detail below. Similarly, the second output shaft 24 is coupled to the rotor of a second motor/generator 28 which also operates in generator mode. The second differential gear box 16 has first 30 and second 32 input shafts, and an output shaft 34. The first input shaft 30 is coupled to the rotor of the first generator 26, and the second input shaft 32 is coupled to the rotor of the second generator 28. The output shaft 34 of the differential gear box 16 provides the drive output for the differential engine 10 as will be described in more detail below. The output shaft 34 is coupled to and drives a load 36, for example, an automobile wheel.

The electric motor 12 operates at a continuous speed and has an output shaft 20 which rotates continuously in one direction, for example, the direction indicated by arrow 21. The output shaft 20 of the electric motor 12 is coupled to the input shaft of the first differential gear box 14. The electric motor 12 rotates continuously irrespective of the motion or lack of motion of the output shaft 34. However, it will be appreciated that the motor 12 can be shut off or slowed down when the output is not needed, for example, when the vehicle is stopped. The speed of the electric motor 12 is set and controlled by the constant motor speed controller 11. Aside from relatively small speed adjustments to the electric motor 12 that may be made to maximize efficiency as a function of torque, the speed controller 11 is set to operate the motor 12 at a continuous speed. If a gas motor is used instead of an electric motor, or in addition to the electric motor 12 (as described below with reference to FIG. 6), then the gas motor can be operated at its most efficient (e.g. high) speed, while small changes in motor speed are made under wider varying loads in order to maintain optimal efficiency.

The output shaft 34 rotates at a controlled speed, with a maximum rotational speed which is typically much lower than the speed of the motor 12. This arrangement for the engine 10 provides speed reduction and torque conversion, in either direction of motion. Although the electric motor 12 is continuously rotating, the output shaft 34 may be completely stationary without the use of clutches or other similar mechanism to uncouple the electric motor 12 from the output shaft 34. It will be appreciated that the electric motor 12 operates under continuous (relatively fixed speed) rotation whether the output shaft 34 is stopped, rotating forwards, or rotating backwards.

The speed of rotation of the output shaft 34 is continuously variable from zero speed through a range of forward and backward speeds. A torque conversion is created (increased) at the output shaft 34 as a function of the ratio of the electric motor 12 speed divided by the output shaft 34 speed, ignoring the loss of efficiency in the two differential gear boxes 14, 16, and losses arising in the motor/generators 26, 28, the battery charging modules 40, 42, and the constant motor speed controller 11 and the controller 70.

As the efficiency of the electric motor 12 is related to a specific combination of speed and torque, there will be an optimum speed for a given torque produced by the electric motor 12. The efficiency of operation of the electric motor 12 could be maintained at the peak level by changing the speed of the motor 12 as a function of measured motor torque, to maximize its efficiency of operation.

Referring back to FIG. 2, the output shaft 20 of the electric motor 12 is coupled to and drives an input shaft 17 on the first differential gear box 14. The first output shaft 22 of the differential gear box 14 rotates in a direction indicated by arrow 23, and the second output shaft 24 rotates in an opposite direction indicated by arrow 25. As the output shaft 22 is coupled to the rotor of the first generator 26, the first input shaft 30 to the second differential gear box 16 rotates at the same speed and in the same direction indicated by arrow 23. Similarly, the second input shaft 32 to the differential gear box 16 rotates at the same speed and in the same direction as the output shaft 24.

The differential gear box 14 comprises a differential gear drive (not shown) with the single shaft input 17 (i.e. coupled to the shaft 20) and dual shaft outputs (i.e. shafts 22 and 24) with a speed ratio of 1:1:1. It will be appreciated that other ratios may be used. A suitable arrangement for the differential gear box 14 is a differential gear system (not shown) having a shaft which is coupled to the motor shaft 20 and connected via a right angled axis to two bevel gears which drive respective shafts coupled to the output shafts 22 and 24. A similar differential gear system, except for the sizing of the gears, (not shown) is suitable for the second differential gear box 16 with the two bevel gears driving shafts coupled to the respective input shafts 30 and 32, and connected via a right angled axis to a shaft which is coupled to the output shaft 34. The input shaft 17 (coupled to the output shaft 20 of the motor 12) and the two output shafts 22 and 24 on the first differential gear box 14 encounter a relatively low torque, and torque level is shared by the shafts 30 and 32. For the second differential gear box 16, the output shaft 34 bears a much high torque load and thus the differential gear box 16 is preferably a "heavier duty" design than the differential gear box 14. The torque at the input shaft 17 is given by the ratio of the output speed (i.e. the speed of the output shaft 34) divided by the input speed (i.e. the speed of the input shaft 30), plus any losses.

It will be appreciated that if one of the output shafts 22 or 24 in the differential gear box 14 has excessive loading force opposing rotation, then the other shaft 22 or 24 increases its rotational speed to the degree that the output shaft 22 or 24 under load reduces its speed.

As described above, the output shafts 22 and 24 drive the input shafts 30 and 32, respectively, for the second differential gear box 16. Loading either one of the output shafts 22 or 24 results in a difference between the rotational speeds of the two output shafts 22 and 24, and this difference in rotational speeds will also exist for input shafts 30 and 32 to the second differential gear box 16. Due to the large speed reduction at the output shaft 34 relative to the speed of the motor 12 and the shafts 20, 22 and the shafts 30, 32, the load torque on either one of the output shafts 22 and 24 is much smaller than the output torque produced by the load on the output shafts 22 and 24.

The shafts 30 and 32 rotating in opposite directions (as indicated by arrows 23 and 25) provide differential inputs which drive the rotating bevel gears (not shown) in the differential gear box 16. The bevel gears (not shown) are connected to the output shaft 34. This gear drive arrangement ensures that if the two input shafts 30 and 32 are rotating at the same speed, than the speed of the output shaft 34 is zero. However, if there is a difference in the relative speeds between the two input shafts 30 and 32, for example, as would occur when one of the shafts 30 or 32 has a load on it, or when one of the shafts 30 or 32 has a load, and the other shaft 30 or 32 has a motoring electrical power load applied under control to provide the required output speed on the output shaft 34. The load causes the shaft 30 (or 32) to reduce its rotational speed, and through the operation of the differential gear system, the speed of the other shaft 32 (or 30) increases, and the differential speed between the two input shafts 30 and 32 is transferred to the output shaft 34 by the differential gear box 16. It will be appreciated that gear arrangements other than bevel gears may be utilized.

As described above, the electric motor 12 is operated at a constant speed which is controlled by the constant motor speed controller 11. The constant speed of the motor 12 is maintained by the controller 11 within the design limits for the engine 10 irrespective of the load energy, i.e. torque, demand and irrespective of the speed of the output shaft 34.

The mechanism for generating a differential speed between the input shafts 30 and 32 comprises utilizing one of the electric motor/generators 26, 28 (operating as generators or as motors according to another embodiment) to create a load on the associated input shaft 30 or 32. As described above, the rotor of the first generator 26 is directly and firmly coupled at one end to the output shaft 22 of the first differential gear box 14, and at the other end to the input shaft 30 of the second differential gear box 16. Similarly, the rotor of the second generator 28 is directly coupled at one end to the output shaft 24, and at the other end to the second input shaft 32. The rotor for the first generator 26 rotates at the same speed as the output shaft 22 and the input shaft 30 for the second differential gear box 16. Similarly, the rotor for the second generator 28 rotates at the same speed as the output shaft 24 and the input shaft 32 for the differential gear box 16. The body of each of the generators 26, 28 is firmly mounted to a fixed assembly, same as bodies of gear boxes 14 and 16, to prevent rotation of the housings for the generators 26 and 28.

Ignoring losses in the differential gear boxes 14 and 16, it will be appreciated that the opposing rotational torque needed to reduce the rotational speed of the input shafts 30 or 32 (or to increase the speed of one of the shafts 30 or 32) is related to the output torque and given by the ratio of the rotational speed of the motor 12 divided by the rotational speed of the output shaft 34 (and when one shaft is loaded and the other shaft is driven or motoring, each differential shaft will need ½ of the torque). Based on this relationship, the high speed at which the motor 12 is operated relative to the maximum rotational speed of the output shaft 34 has the desirable effect of reducing the maximum loading force required to produce the required rotational speed at the output shaft 34 and advantageously enables the use of relatively small motors for the generators 26 and 28. This can be further enhanced if a gear ratio is applied between each of the motor/generators 26, 28 and the two associated shafts 22, 30 and 24, 32, such that the motor 26, 28 turns at a higher speed.

As shown in FIG. 2, the differential engine 10 includes a regenerative charging current circuit indicated generally by reference 15. The regenerative charging circuit 15 comprises a pair of battery charger modules 40 and 42. The first battery charger module 40 is coupled to the output of the first motor/generator 26, and similarly the second battery charger module 42 is coupled to the output of the second motor/generator 28. The battery charger modules 40 and 42 are coupled to an energy storage device 50, for example a battery or other suitable device as described below, and generate regenerative charging currents. The regenerative charging currents are generated as a result of the loading of the output and input shaft pairs 22, 30 and 24, 32, for example during braking, accelerating, decelerating, or at any time that the speed of the output shaft 34 is under load, and serve to optimize the efficiency of the electric motor 12.

Referring to FIG. 2, the output of the first battery charger module 40 is coupled to one terminal of the battery 50 through a diode 60. Similarly, the output of the second battery charger module 42 is coupled to the terminal of the battery 50 through a second diode 62. The other terminal of the battery 50 is coupled to the return inputs of the battery charger modules 40 and 42. The diodes 60 and 62 ensure that the charging currents from the respective battery charger modules 40 and 42 flow to the battery 50 and not back to either of the battery charger modules 40 and 42. It will be appreciated that the diodes 60 and 62 may be replaced by other functionally equivalent components.

The battery charger modules 40 and 42 are each coupled to a controller module indicated by reference 70. A principal function of the controller module 70 is to independently control the operation of each battery charger module 40 and 42 and provide the desired speed output and directional rotation of the output shaft 34 as will be described in more detail below. In addition to control of the battery charger modules 40, 42, the controller 70 is suitably programmed to perform other control functions as described below.

The rotational speed of the output shaft 34 is controlled by creating a difference in the rotational speed between the input shafts 30 and 32 to the differential gear box 16. The speed difference between the input shafts is creating by loading either the output shaft 22 and the input shaft 30, or by loading the output shaft 24 and the input shaft 32. As will now be described in more detail, the loading of the output shaft 30 involves applying a force in opposition to the direction of rotation of the input shaft 22 and the output shaft 30 through the operation of the motor/generator 26. Similarly, the loading of the output shaft 32 involves applying a force in opposition to the direction of rotation of the input shaft 24 and the output shaft 32 through the operation of the motor/generator 28. If no current flow is being demanded of the generator 26 by the battery charger module 40, then there will be no load applied to the output shaft 22. Similarly for the second output shaft 24, there is no load applied if the battery charger module 42 is not drawing current from the generator 28. Although the rotors of the generators 26 and 28 are rotating as a result of the rotation of the output shaft 20 of motor 12 which is transferred to the output shafts 22 and 24 via the differential gear box 14, there is no loading if current is not being drawn from either of the generators 26 and 28. As shown in FIG. 2, the input shaft 30 includes a speed/torque sensor 31 which provides speed and/or torque readings on output F to the controller module 70. Similarly, the other input shaft 32 includes a speed/torque sensor 33 which provides speed and/or torque readings to the controller module 70 on output G.

Current is demanded from one of the generators 26 or 28 by the controller 70 activating one of the battery charger modules 40 or 42 to supply a charging current to the battery 50. When the battery charger module 40 is activated by the controller 70, the battery charger module 40 is turned on and a current is drawn from the generator 26 to produce the charging current which is output to the battery 50 through the diode 60. Similarly, activation of the battery charger module 42 by the controller 70 results in the battery charger module 42 drawing a current from the generator 28 to produce a charging current which is directed by the diode 62 to the battery 50. As a result of the current draw, the generator 26 creates a force which opposes the rotation of the output shaft 30 and results in a change in the rotational speed of the input shaft 30 to the differential gear box 16. Similarly, if the second battery charger module 42 is activated, the generator 28 creates a force as a result of the current draw which opposes the rotation of the output shaft 32 and results in a change in the rotational speed of the input shaft 32 to the differential gear box 16. The size of the force and resultant loading on the input shaft 30 or 32 will vary with the amount of current being drawn under the control of the controller 70. The difference in the speeds of the input shafts 30 and 32 is translated by the differential gear box 16 to the output shaft 34. The direction of the rotation as indicated by arrow 35 of the output shaft 34 is dependent on which generator 26 or 28 is being loaded. In this way, the charging currents produced by the battery charging modules 40 and 42 comprise a regenerative charging current that is recovered from the force (energy) applied by the generator 26 to 28 to load, i.e. slow down or brake, the input 22, 24 and the output 30, 32 shafts. Slowing down the input shafts 22, 24 or the output shafts 30, 32 increases the speed of the corresponding input shaft 24, 22 and the output shafts 30, 32, and the speed of the output shaft 34 equals the difference in speeds between the differential shaft pairs 22, 30 and 24, 32.

As shown in FIG. 2, the differential engine 10 includes a speed sensor 90 and a torque sensor 91. The speed sensor 90 which may comprise a tachometer is coupled to the output shaft 34 and senses the rotational speed and direction of the output shaft 34. The torque sensor 91 senses the torque output of the output shaft 34. The torque and speed readings for the output shaft 34 are provided to the battery charger controller 70 in a feedback loop 71. The battery charger controller 70 includes an input 74 for receiving a speed control input signal. The battery charger controller 70 preferably comprises a programmable device, such as a microprocessor-based controller. The microprocessor is suitably programmed to execute a program in firmware comprising a sequence of operations that control the operation of the battery charger modules 40 and 42 as described.

Referring to FIG. 2, the output voltages from the battery charger modules 40, 42 control the charging level, which is the difference between the charging voltage output and the voltage of the battery 50. As such the battery charger modules 40, 42 function as variable power voltage power supplies. In the context of the present invention, the battery charger modules 40, 42 may comprise a single quadrant topology, meaning that the modules 40, 42 only take power from the motor/generators 26, 28, i.e. utilizing the motor/generator 26, 28 only in the generator mode and pass it to the battery 50. The battery charger modules 40, 42 may also comprise a two quadrant topology, meaning that the modules 40, 42 can take power from the motor/generators 26, 28, and pass it to the battery 50, and in addition, the battery charger modules 40, 42 can take power from the battery 50, or another source, and pass the power back to the motor/generator 26, 28. The two quadrant topology allows the motor/generators 26, 28 to be operated in motor mode.

As shown in FIG. 2, the battery charger controller 70 has respective control outputs 73, 75 to the battery charger modules 40, 42. The controller 70 issues control signals on the outputs 73, 75 to set the output voltage levels from the respective battery charger modules 40, 42. In operation, the controller 70 measures the speed and direction of rotation (arrow 35) of the output shaft 34 via the torque and speed sensor 90, and compares the measured input to the speed control input 74. The controller 70 also measures the current outputs of the battery charger modules 40, 42 on respective inputs 76, 78, and the current from the battery 50 to the motor 12 on input 80. In response to a signal on the speed control input 74, the battery charger controller 70 activates the battery charger module 40 or 42 and sets the current draw from the generator 26 or 28 to load the respective input shaft 30 or 32 in order to achieve the desired rotational speed for the output shaft 34. The battery charger controller 70 uses the output from the speed sensor 90 to determine the actual rotational speed of the output shaft 34, and if the actual speed is not within the desired range of the speed control input 74, adjustments are made to the current drawn by the battery charger module 40 or 42 to vary the loading on the input shaft 30 or 32 by the generator 26 or 28. When the output voltage from the battery charger modules 40, 42 as measured on inputs 80, 82 to the controller 70 shows that the battery 50 is fully charged, the controller 70 stops charging process of the battery 50 by the battery charger modules 40, 42. The resultant load of the battery charger module 40, 42 is removed, and any reverse current from the battery 50 to the battery charger modules 40, 42 is blocked by the diodes 60, 62.

Preferably, the controller 70 includes suitable programming for controlling the level of utilization of the output voltage from the motor/generator 26 to be applied to the motor/generator 28 to operate the motor/generator 26 in generator mode and the motor/generator 28 in motor mode. Similarly, the controller 70 includes programming to control the level of utilization of the output voltage from the motor/generator 28 to be applied to the motor/generator 26 to operate the motor/generator 28 in generator mode and the motor/generator 26 in motor mode.

As described above, through the current demand created by the battery charger modules 40, 42 on the generators 26, 28 respectively, under the control of the controller 70, a regenerating charging current for charging the battery 50 is generated at the same time as the rotating torque output for the output shaft 34. The arrangement for the engine 10 will produce a regenerating charging current to the battery 50 whenever the output shaft 34 is rotating, whether the rotation is at a constant velocity, accelerating or decelerating, in either a backward or a forward. By increasing the current draw on the generator 26 or 28, a braking process for the engine 10 may be achieved. During the braking process, a regenerating charging current for the battery 50 is produced at the same time as the braking force on the output shaft 34 as a result of the loading on one of the input shafts 30 or 32 by the respective generator 26 or 28.

The battery charger controller 70 may include inputs for monitoring other parameters, such as temperature of the battery 50, ambient temperature, temperature of the motor 12, environmental humidity. These parameters may be utilized to optimize the efficiency of the energy conversion processes associated with the operation of the engine 10.

Figure 7:
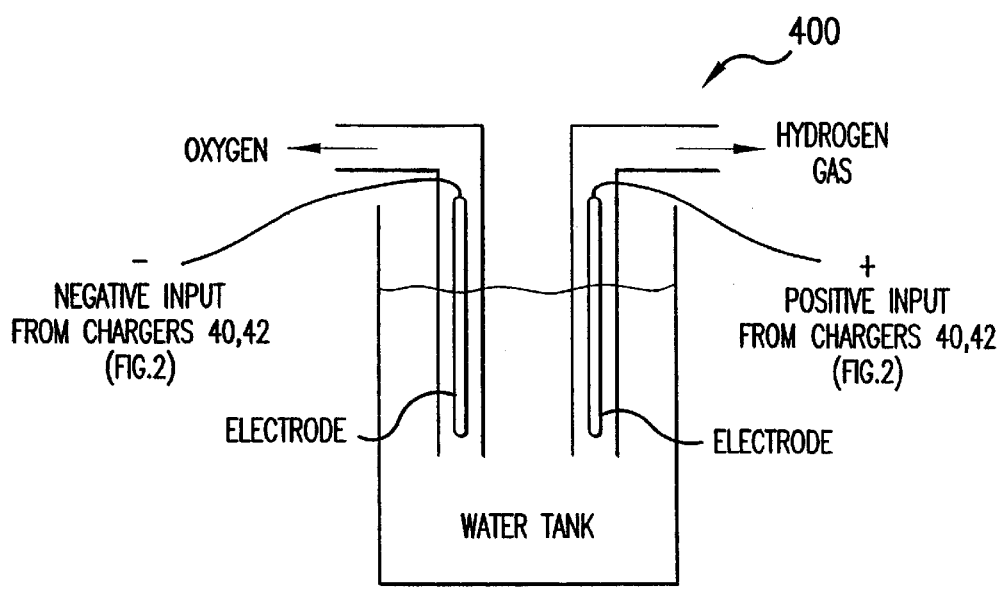
FIG. 7 is a schematic diagram of a water electrolysis system for providing a chemical load in the differential engine according to the present invention.

In order to account for situations where the battery 50 is fully charged or where the electric motor 12 is replaced by a gas or other non-electric or non-battery powered motor, or the source of electrical energy is a fuel cell without an electrical storage capability, or the load to the battery chargers 40, 42 is a chemical load such as water electrolysis system 400 as shown in FIG. 7 to generate hydrogen and oxygen, the differential engine 10 may include an electronic power module denoted by reference 92 in FIG. 2. The electronic power module 92 comprises first and second motor driver modules indicated by references 27 and 29, respectively. The first motor driver module 27 is coupled through a control line to the motor/generator 26, and similarly, the second motor driver module 29 is coupled through another control line to the motor/generator 28. The motor driver module 27 has a control input 31 which is coupled to a control signal output 84 on the controller 70. The motor driver module 27 also includes a power input 33 which is coupled to and receives electrical power from the motor/generator 26 at output C. In a similar manner, the second motor driver module 29 has a control input 35 which is coupled to another control signal output 86 on the controller 70, and a power input 37 which receives electrical power from the motor/generator 28 output D.

Under the control of the controller 70, the electronic power module 92, i.e. the motor driver modules 27, 29, operates the motor/generators 26, 28 in both motor and generator modes, with one of the motor/generators 26, 28 operating as a motor, and the other motor/generator 26, 28 operating as a generator. For example, if the electronic power module 92 operates the first motor/generator 26 in generator mode, and the second motor/generator 28 in motor mode, then the first motor/generator 26 loads the shaft 22/30 and provides a source of electrical energy. The electrical power generated by the motor/generator 26 is outputted to the power input 33 of the first motor driver module 27. The first motor driver module 27 directs the power from the first generator 26 to the second motor/generator 28 which is operated as a motor. The second motor/generator 28 is operated in a direction that results in a differential speed between the two shaft pairs 22/30 and 24/32, which in turn results in the appropriate rotation of the output shaft 34.

It will be appreciated that the energy generated by the motor/generator 26, 28 operating as a generator under the control of the associated motor driver 27, 29 provides the energy to power the other motor/generator 26, 28 and thereby provide the source of rotational energy for powering the output shaft 34. This results in a highly efficient energy conversion mechanism. While some electrical energy is required for the controller 70 and the motor drivers 27, 29 to effect the control function, the electrical energy is on the "signal level", and as such does not constitute a significant outlay.

Advantageously, the electronic power module 92 can be controlled by the controller 70 in conjunction with the battery charger modules 40, 42 to further improve the energy conversion mechanisms embodied in the differential engine 10 according to the present invention. For instance, the controller 70 may be suitably programmed to actuate the battery charging modules 40, 42 to effect the loading of the associated shaft pairs 22/30, 24/32 (as described above to achieve the differential speed and resultant rotation of the output shaft 34) and also charge the battery 50 as needed. Once the battery 50 has been suitably charged, then the electric power module 92 is utilized to operate the motor/generators 26, 28 in generator and motor mode to generate the differential speed between the shaft pairs 22/30 and 24/32 as described above.

Referring again to FIG. 2, the controller 70 may include a high speed network bus indicated by reference 94. The high speed network bus 94 comprises a Control Area Network or CAN and provides a communication path for communicating operational status between multiple differential engines 10. For example, if each of the rear wheels (i.e. load 36 in FIG. 2) are coupled to separate differential electric engines 10, then the bus 94 allows the controllers 70 for the respective engines 10 to communicate the respective operational status and parameters to each other together with output of a turning monitor 96 associated with each of the differential engines 10. The turning monitor 96 is coupled to the output shaft 34 and measures the turning radius and speed of the output shaft 34 to indicate the optimal differential speed of the wheel, i.e. load 36. Advantageously, high speed sharing of operational information via the bus 94 allows the controllers 70 for the respective differential electric engines 10 to share efficiency data, desired speed, output speed and directional data, which may be further utilized to improve the operating efficiency.

According to another aspect, the differential electric engine 10 as described above provides a four quadrant motion generation. When the output shaft 34 is driving a load in one direction at a given speed as a result of one of the input shafts 30 or 32 being loaded by its associated generator 26 or 28, the speed can be reduced under full control by removing the load from the input shaft, for example the input shaft 30 being loaded by the generator 26, and at the same time the other generator 28 can create a load on the other input shaft 32, for example, to produce a controlled decelerating force which is transferred by the differential gear box 16 to the output shaft 34. It will be appreciated that this arrangement represents two quadrants of control. Since the output shaft 34 can be rotated in both the forward and reverse directions, the arrangement for the engine 10 is extended to four quadrant motion control system. It will be appreciated that with the arrangement of the electronic power module 92, the differential electric engine 10 continues to provide four quadrant motion control.

If the load 36 connected to the output shaft 34 comprises an automobile wheel (or wheels), then the amount of torque required to maintain a given rotational speed for the output shaft 34 will vary, and depend on the load 36, for example, the grade of road over the automobile wheels are traveling, the wind resistance of the automobile, etc. In this and other applications, it is desirable to maintain the desired speed of the vehicle constant irrespective of the load 36 on the output shaft 34. To maintain the speed constant, the load produced by the loading generator 26 or 28 (depending on the rotational direction of the output shaft 34) is varied to change the rotational torque produced at the output shaft 34. The generators 26 or 28 may also be controlled to produce a braking effect. For example, if the current demand on the first generator 26 is reduced to zero and a current demand is placed on the second generator 28 to produce a decelerating or braking force on the output shaft 34 to maintain the speed of the wheel/automobile when it is going down a hill (or experiencing a load from another type of source).

The arrangement of the epicyclic transmission 13 as described above comprises two load creating motor/generators 26 and 28. The two individual generators 26 and 28 allow a rotational torque to be produced on the output shaft 34 in either direction. If the transmission 13 included a single generator 26 or 28 on one of output and input shaft pairs, then the transmission 13 could only produce rotational torque in only one direction. In this case, the force slowing down the rotation of the output shaft 34 would be from the friction of the load 36 coupled to the output shaft 34 and also due to frictional forces within the differential engine 10, when the load current on the single generator 26 is reduced to zero.

Figure 3A:
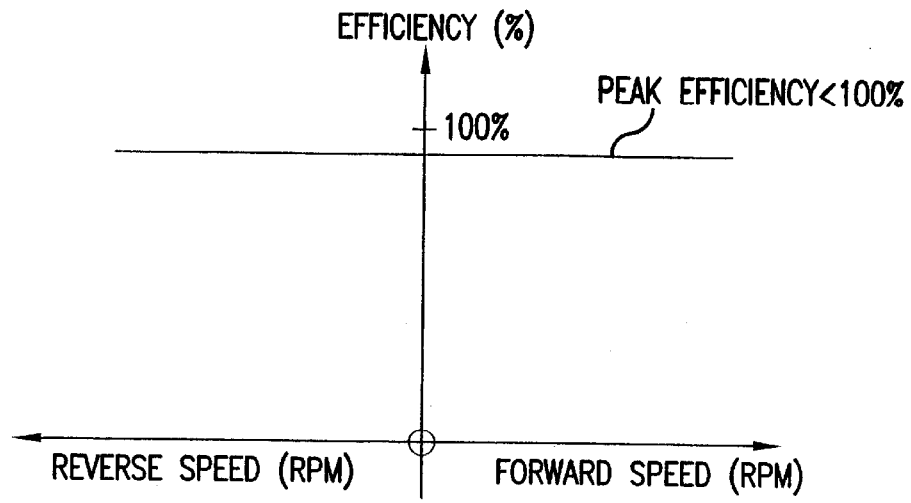
FIG. 3(*a*) is a graphical representation of the output efficiency versus speed curve for the differential engine according to the present invention.
Figure 3B:
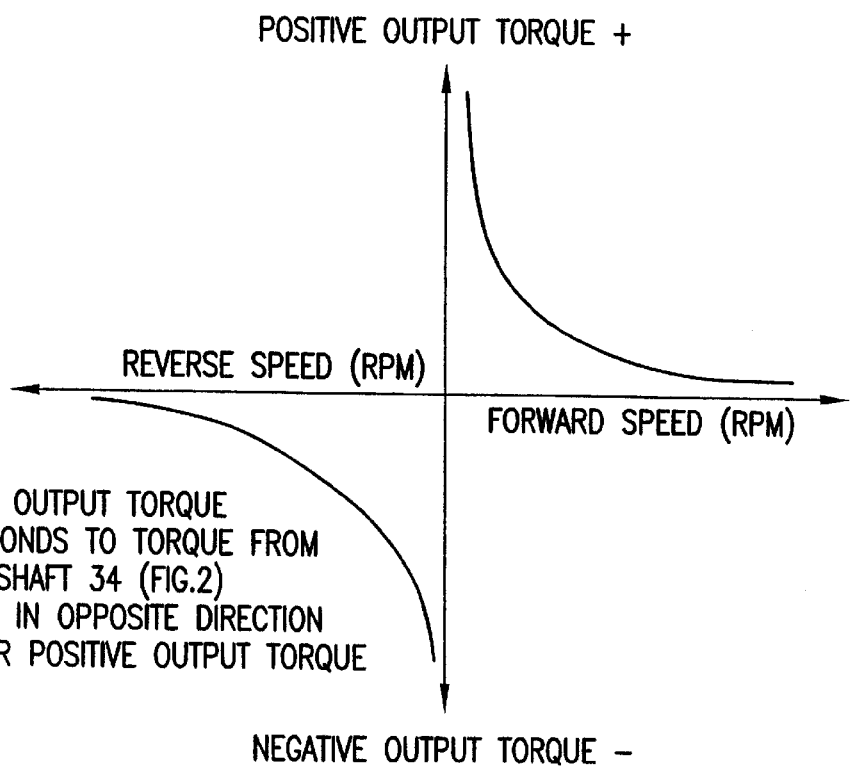

Representative efficiency versus output speed curves for the differential electric engine 10 according to the present invention are shown in FIG. 3(a), and representative output torque versus output speed curves for the differential electric engine 10 are depicted in FIG. 3(b). Referring to FIG. 3(a), the output efficiency of the differential electric engine 10 is the peak efficiency of the motor 12 (when it is operated at its peak efficient point by the controller 70 and 11, ignoring any losses in the components 14, 16, 30, 70, 40, 42, 27 and 29, and the peak efficiency of electric motors can be expected to be in the range of 80% to something less than 100%) in both the forward direction (curve $E_F$) and in the reverse direction (curve $E_R$) Referring to FIG. 3(b), it will be appreciated that the differential electric engine 10 provides peak output torque applied to the load (e.g. wheel 36 in FIG. 2) at all speeds in both the forward direction (curve $T_F$) and in the reverse direction (curve $T_R$)

According to another aspect of the invention, the output shaft 22 and the input shaft 30 include embedded high current conductors to become the rotor for an induction squirrel cage motor/generator. The output shaft 22 and the input shaft 30 are coupled together to form the rotor for the generator 26 and provide a squirrel cage induction type generator. Similarly, the rotor for the second motor/generator 28 may be replaced by connecting the output shaft 24 and the input shaft 32 and forming an induction squirrel cage motor/generator on the shafts 24 and 32.

According to yet another aspect of the invention, the energy storage device 50 in FIG. 2 may comprise other types of electrical energy storage devices other than a battery 50, such as a fuel cell, an electrical powered flywheel, a super capacitor. In the case of an electrical powered flywheel, the battery charger modules 40, 42 power motor/generators which drive the rotating flywheel element(s) to increase the speed of rotation and store the energy in the form of kinetic energy. The stored energy is recovered by operating the motor/generators in generator mode to convert the kinetic energy into electrical energy. Operation in generator mode reduces the kinetic energy stored in the rotating flywheel by slowing down the rotation of the flywheel.

If the battery 50 is replaced by a fuel cell or a hydrogen generator for use of the hydrogen by the fuel cell as shown in FIG. 7, the electric energy generated through the battery charger modules 40, 42 can be used to create an effectively reversible chemical reaction through the generation of a secondary fuel for the fuel cell or other energy generating process. For example, if the electrical energy was used to create hydrogen (or other energy useful chemical), then this hydrogen can be used by the fuel cell for conversion to electricity by chemical means. It will be appreciated that the waste product of a fuel cell is water, which could replenish the water in the cell, though it is clear that this recovery loop will be less than 100%. Alternatively, electrical energy could be used to create a chemical energy which produces a fuel suitable for a mechanical energy conversion, such as a gas type engine. Also, the hydrogen produced by the above process could be used in a gas engine to combine with the air intake to increase the efficiency of the engine, increase the power output and reduce toxic emissions.

Figure 4:
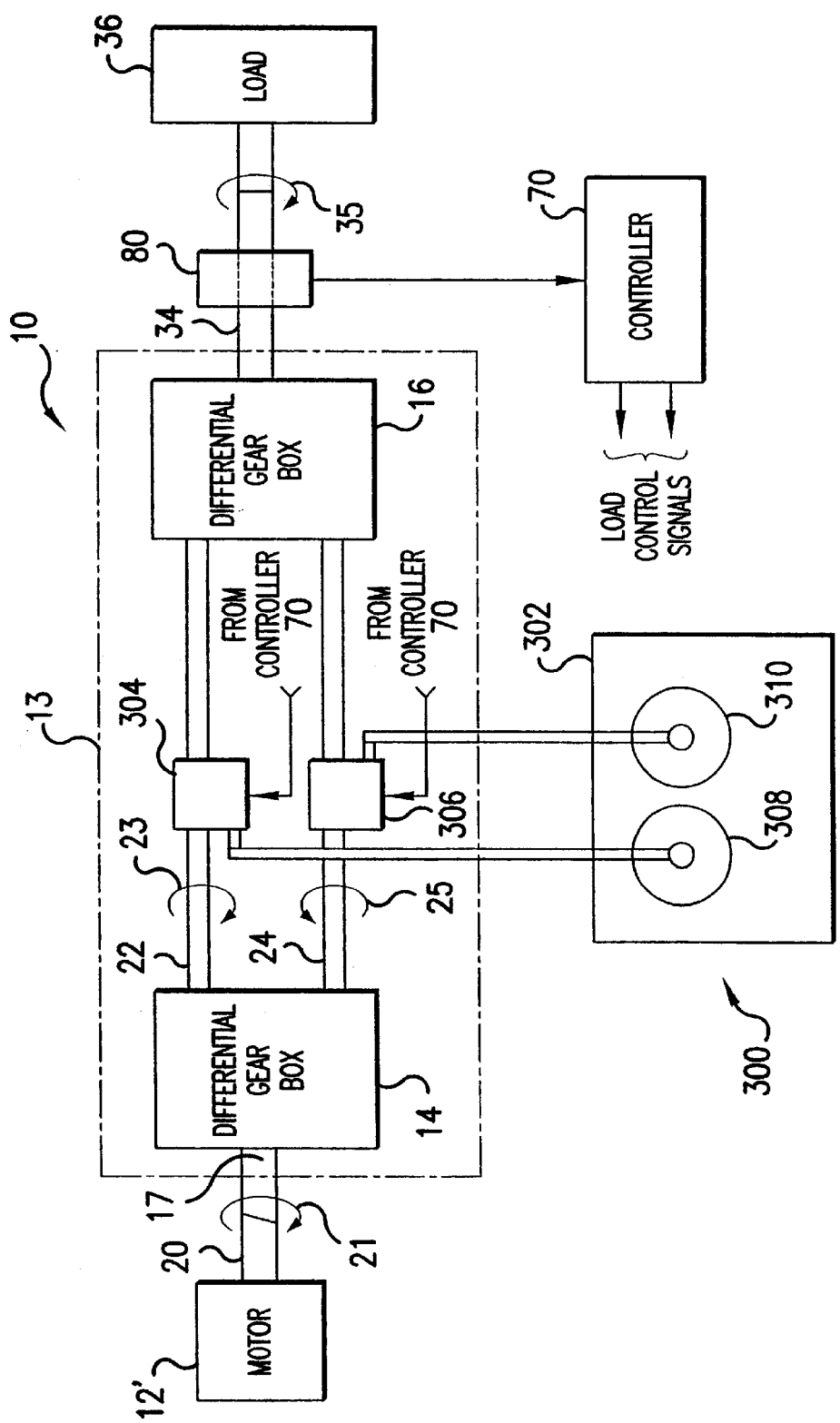
FIG. 4 is a block diagram of a differential engine according to another embodiment of the present invention.

Reference is next made to FIG. 4, which shows a variation of the differential engine according to the present invention. As shown in FIG. 4, the motor/generators 26, 28 and the regenerative charging current circuit 15 are replaced by a mechanical loading and kinetic energy storage system indicated generally by reference 300. The mechanical loading system 300 comprises a mechanical flywheel storage device 302 which is connected to the shafts 22/30, 24/32 through respective mechanical couplers 304 and 306. The mechanical flywheel storage device may comprise a single mechanical flywheel, or as shown in FIG. 4, a mechanical flywheel 308 for the first shaft pair 22/30, and another mechanical flywheel 310 for the second shaft pair 24/32. The mechanical coupling may comprise mechanical mechanisms (e.g. gear and drive shaft components), or alternatively magnetic or fluid drive coupling mechanisms.

Figure 5:
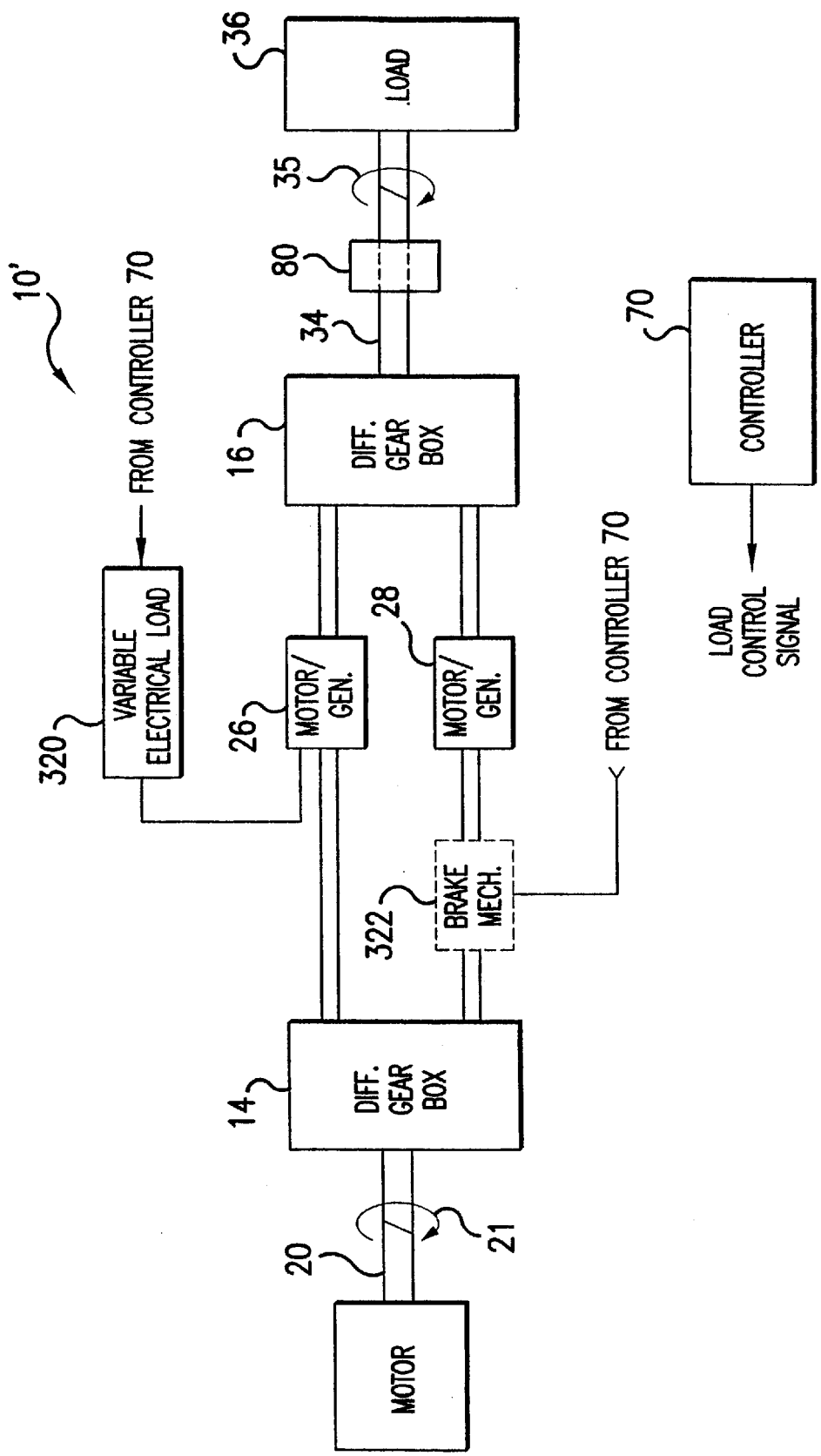
FIG. 5 is a block diagram of a differential engine according to another embodiment of the present invention.

In another variation as shown in FIG. 5, the motor/generators 26, 28 are not connected to a regenerative charging current circuit 15 or other type of energy storage device. Instead, one of the motor/generators 26, 28 is connected to an electrical load 320 which is variable by the controller 70. The electrical load 320 may comprise an electronically controllable resistor or a variable electric short (e.g. pulse width modulated). The application of the electrical load 320 is controlled by through the controller 70 which issues suitable control signals for varying load applied to the shaft pair 22/30 or 24/32 based on the actual and desired output speeds of the output shaft 34 (as described in more detail above). In yet another variation, the loading on the shaft pairs 22/30, 24/32 may be a mechanical load applied, for example, through a brake frictional mechanism 322 (shown in broken outline in FIG. 5) or a hydraulic or fluid drive mechanism. The application of the mechanical load 322 is controlled by the controller 70. It will be appreciated that while such loading mechanisms are effective to produce the speed differential between the shaft pairs 22/30, 24/32, the applied energy is non-recoverable.

Figure 6:
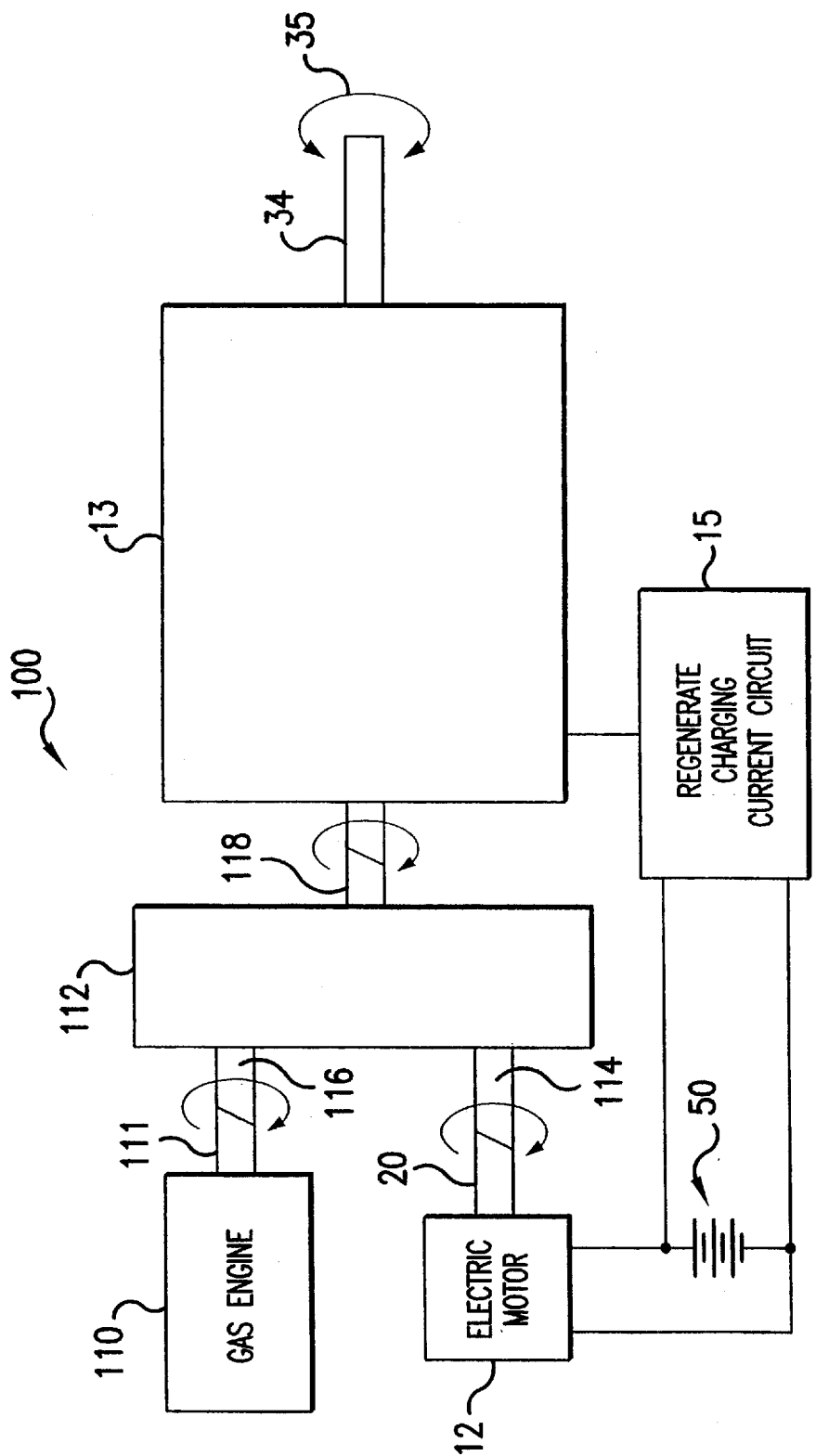
FIG. 6 is a block diagram of a differential engine according to another embodiment of the present invention.

Reference is next made to FIG. 6, which shows another embodiment of a differential engine according to the present invention and is indicated generally by reference 100. The differential engine 100 as shown in FIG. 6 includes a gas motor 110, or other suitable source for providing rotary motion, has an output shaft 111 which provides a rotational torque output. The gas engine 110 serves as an auxiliary motor, and can supplement, or temporarily or permanently replace, the rotational torque provided by the single electric motor 12. The single electric motor 12 as described above with reference to FIG. 2, has an output shaft 20 which also provides a rotational torque output.

In addition to the electric motor 12 and the gas engine, the differential engine 100 includes a differential gear box 112, an epicyclic transmission 13 (as described above for FIG. 2), and a regenerative charging current circuit 15 (as also described above for FIG. 2). The differential gear box 112 is similar to the differential gear box 16 described above for the epicyclic transmission 13 except for its operation in the shafts 20 and 111 turn in the same direction and the respective torques are additive. The differential gear box 112 has first 114 and second 116 input shafts and an output shaft 118. The first input shaft 114 is coupled to the output shaft 20 of the electric motor 12, and similarly, the second input shaft 116 is coupled to the output shaft 111 of the gas motor 110. The output shaft 118 of the differential gear box 112 is coupled to the input shaft 21 on the differential gear box 14 (FIG. 2) in the epicyclic transmission 13. The rotational torque output of the differential engine 100 is provided on output shaft 34 which may rotate in either direction as indicated by arrow 35.

For the differential gear box 112, the input shafts 114 and 116 rotate at the same speed as the output shaft 118. The output shaft 118 provides a rotational torque output to the epicyclic transmission 13 in a similar manner to the output shaft 20 of the electric motor 12 as described above for FIG. 2. For the differential engine 100, the ratio of the speed of the output shaft 111 from the gas motor 110 to the speed of output shaft 118 of the differential gear box 112 may be different than 1:1 in order to increase or decrease the effective speed of the gas motor 110. By decreasing or increasing the effective speed of the gas motor 110, the output shaft 118 can be made to rotate at the same speed (as indicated by arrow 119) as the output shaft 20 from the electric motor 12.

The arrangement shown in FIG. 6 provides the capability to use the gas motor 110 together with the electric motor 12 in a manner that optimizes the efficiency of the overall differential engine 100. The gas motor 110 provides an additional rotational torque input which contributes to the regenerative charging current to the battery so that there could be a net gain of stored energy in the battery 50, if the differential electric engine 100 provides more energy than that lost within the inefficiencies of the load connected to the output shaft 34. In another aspect, the gas motor 110 may be used as the sole source of rotational torque to drive the epicyclic transmission 13, and also charge the battery 50 through the regenerative charging current circuit 15 including the operation of the charging system, under a charged battery condition or non-battery system, to provide power to the motor drives 27, 29, or as described above. In the arrangement, where there is only the gas motor 110, the gas motor 110 may be controlled to rotate at its most efficient (i.e. peak efficient point) speed and with this speed slightly varied to maintain peak efficiency of engine operation under changing loads.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A differential engine with a variable torque output, said differential engine comprising:
   (a) a motor for driving an output at a rotational speed and applying an input rotational torque to said output;
   (b) a torque conversion stage coupled to said motor for converting said input rotational torque into a rotational torque at an output drive for coupling to a load;
   (c) said torque conversion stage including a first differential stage, said first differential stage having an input coupled to the output of said motor, and said first differential stage having a gear mechanism for translating the rotational torque from said input to first and second outputs and said gear mechanism driving each of said first and second outputs at the same speed and in opposing rotational directions;
   (d) said torque conversion stage including a second differential stage, said second differential stage having a first input coupled to the first output of said first differential stage, and a second input coupled to the second output of said first differential stage, and including a gear mechanism for applying a rotational torque to said output drive when a difference occurs between the rotational speeds of the first and second input shafts for the second differential stage;
   (e) a loading mechanism, said loading mechanism being coupled to one of said inputs on said second differential stage, said loading mechanism being responsive to a control input for loading said input to vary the rotational speed of the associated input.

2. A transmission for imparting controlled torque and/or speed to an output drive connected to load, said transmission comprising:
   1) a first input driven mechanism connected to a driving mechanism;
   2) a first differential gearbox connected to said first input driven mechanism;
   3) a first and second output connected to said first differential gearbox, each output rotating in opposite directions;
   4) at least one loading mechanism connected to said first or second output from said first differential gearbox;

5) said first and second outputs from said first differential gearbox serving as first and second inputs to a second differential gearbox;
6) at least one output coupled to said at least one loading mechanism and providing controlled input to the second differential gearbox;
7) an output from said second differential gearbox;
8) said load connected to said output;

wherein said torque and/or speed of said output may be variably controlled by said at least one loading mechanism.

3. A differential transmission with a torque output, said differential transmission comprising:
   a) an output for receiving rotational energy from an energy source at a rotational speed and applying a rotational torque to said output;
   b) a torque conversion stage for coupling to said energy source for converting said rotational torque into an output rotational torque at an output drive for coupling to a load;
   c) said torque conversion stage including a first differential stage, said first differential stage having an input coupled to the output of said energy source, said first differential stage having a mechanism for translating the rotational torque from said input to first and second outputs, and said mechanism driving each of said first and second outputs at the same speed and in opposing rotational directions;
   d) said torque conversion stage including a second differential stage said second differential stage having a first input coupled to the first output of said first differential stage, and a second input coupled to the second output, of said first differential stage and including a mechanism for applying a rotational torque to said output when a difference occurs between the rotational speeds of the first and second inputs, for the second differential stage;
   e) a loading mechanism, said loading mechanism being coupled to one of said inputs on said second differential stage, said loading mechanism being responsive to a control signal for loading said input to vary the rotational speed of the associated input.

4. The transmission of claim 2 or 3 wherein the output from said transmission is used to drive at least one wheel of a motor vehicle.

5. The transmission of claim 2 or 3 wherein the driving mechanism further comprises an electric motor and/or internal combustion engine.

6. The transmission of claim 2 or 3 wherein the loading mechanism further comprises a motor/generator separately coupled to each of said first and second outputs.

7. The transmission of claim 6 wherein the output from one of said motor/generator when operated as a generator is used to provide electrical input to the other of said motor/generator when operated as a motor.

8. The transmission of claim 7 wherein the motor/generators are controlled by a control circuit providing for variation between operating modes of:
   1) fully stopped
   2) as a generator and
   3) as a motor and controlling the level of electrical input to the motor/generator when operated as a motor.

9. The transmission of claim 2 or 3 wherein a variable control of said loading mechanism is provided by a network and providing an interface to another transmission.

10. The device as claimed in claim 1, 2 or 3, wherein said loading mechanism comprises a first electric motor/generator having a first rotor, said first rotor being coupled to one of said first and second outputs of said first differential stage, and the said rotor being coupled to the corresponding input of said second differential stage, and said electric first motor/generator including an output for coupling to a load capable of drawing a current from said electric motor/generator in response to the control signal.

11. The device as claimed in claim 10, said loading mechanism comprises a second electric motor/generator having a second rotor, said second rotor being coupled to the other output of said first differential stage, and said rotor being coupled to the other input of said second differential stage, and said second electric motor/generator including an input for coupling to output of said first electric motor/generator and drawing a current from said first electric motor/generator in response to the drive control input.

12. The device as claimed in claim 11, further including a controller for generating the control signal and said drive control input, said controller having a generator driver coupled to said electric motor/generators and being responsive to the control signal for operating said electric motor/generator to load one of said inputs and said controller including a motor driver coupled to said electric motor/generators and being responsive to said drive control input for operating said electric motor/generators to rotate said other input, and said controller including a speed sensor coupled to said output drive for determining the rotational speed of said output drive.

13. The transmission of claim 8 further comprising a high speed network bus including a control area network providing a communication path for communicating operational status between multiple differential engines and control thereof.

14. The transmission of claim 9 further comprising a high speed network bus including a control area network providing a communication path for communicating operational status between multiple differential engines and control thereof.

* * * * *